Nov. 17, 1959

R. C. KERSH 2,912,999

FLUID CHECK VALVE

Filed July 18, 1955

INVENTOR
RONALD C. KERSH
BY
Gardner + Zimmerman
ATTORNEYS

United States Patent Office 2,912,999
Patented Nov. 17, 1959

2,912,999

FLUID CHECK VALVE

Ronald C. Kersh, Orinda, Calif.

Application July 18, 1955, Serial No. 522,610

2 Claims. (Cl. 137—512.4)

This invention relates to valve constructions, and is more particularly directed towards a check valve designed to permit fluid to pass through the same in one direction only, any fluid flow in an opposite direction tending to immediately close the valve.

Check valves are widely used in various installations and may take numerous types of forms, such as globe check valves, swing check valves and ball check valves. However, there are certain defects present with the prior art devices which do not permit the same to be readily used with optimum results where the line in which the valve is positioned may alternately carry a liquid or a gaseous fluid.

Accordingly, it is an object of the present invention to provide a check valve which will completely eliminate the back flow of a liquid or gas, but will readily permit the normal flow of the fluid through the line.

A further object of the invention is to provide a check valve of the character described in which a flexible membrane is utilized, such membrane being deformable to permit normal flow of fluid in a line, but which will normally be seated on the periphery of the conduit and be urged thereagainst if any back pressure builds up.

Another object of the invention is to provide a check valve as hereinabove defined which may be constructed at extremely low cost and in which there are no separate moving parts to the unit, thereby eliminating costly repairs and complicated maintenance or cleaning difficulties.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
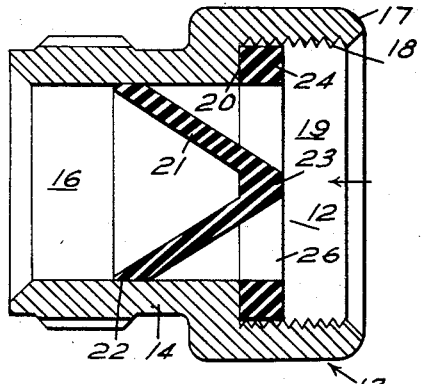
Figure 1 is a cross-sectional elevational view of a coupling provided with one form of check valve construction.

Although four different embodiments of check valves are shown in the drawing, all of the different embodiments utilize a deformable membrane which is normally positioned so as to prevent flow of fluid in a conduit or the like but which may be easily deformed upon normal fluid flow in the conduit. Thus, upon any back flow or reverse pressure being applied to the membrane member, the same will return to its normal position closing the conduit, and the greater the back flow pressure, the more effective seal will be obtained between the membrane and conduit walls.

Figure 2:
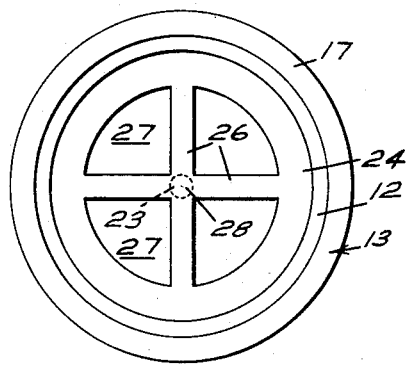
Figure 2 is an end view of the construction shown in Figure 1.

Referring first to the embodiment of the present invention as disclosed in Figures 1 and 2 of the drawing, the check valve, generally designated by the numeral 12 is shown in operative position in a coupling 13. Coupling 13 is provided with side walls 14 defining a bore 16 and a radially enlarged extension 17 having internal threads 18, this latter portion defining an enlarged counterbore 19 in axial alignment with the main bore 16. At the juncture of the two bores there is provided a shoulder 20 whose function will be presently explained. As will be understood, the threads 18 are adapted to receive the external threads of a male fitting (not shown) so that the coupling may be placed in flow communication with another conduit, pipe or hose member. The check valve 12 includes a conically shaped member 21, the distal ends of the body thereof having flattened portions 22 which normally engage the inner peripheral walls defining the bore 16. The apex 23 of the conical member 21 is directed towards the normal direction of flow, as indicated by the arrows, and is positioned along the axial center line of the bores 16 and 19.

In order to maintain the conical member 21 in its aforesaid axially aligned position within the bores, there is preferably provided an annular ring 24 which is positioned against the shoulders 20 and may be maintained in such position when a male coupling member is threadedly engaged with the threads 18. Ring 24 is provided with a plurality of radially extending ribs 26 with spaces 27 disposed between adjacent ribs, and the apex 23 of the cone is integrally joined to the ring at the juncture 28 of the respective ribs. In this manner, it will be readily appreciated that fluid flowing in the direction of the arrow will enter bore 19 and readily pass through the passages 27 between the ribs 26. Then, by virtue of the fact that the conical member 21 is formed of flexible material, the legs of the latter will be forced away from the walls 14 leaving an annular passage between the cone portions 22 and the walls 14 so as to permit the flow of fluid therebetween. However, in the event of back flow or any back pressure in the bore 16, such pressure will force the conical member 21 into firm sealing engagement with the bore walls. Obviously, the greater the pressure, the more effective the seal will be between cone portion 22 and the walls and therefore whether a gas or liquid is in the line, the flexible membrane formed by the cone 21 will prevent leakage in the line. As illustrated in the drawing, the member 21 as well as the ring 24 and ribs 26 are formed of rubber and may be integrally molded as a single unit. However, it will be appreciated that other materials might likewise be used for the construction of the valve and it is contemplated that materials such as spring steel, synthetic rubber compositions, and even plastic molded units could be satisfactorily utilized. However, it must be remembered that the prime requisite for the valve is its easy deformability during normal flow of fluid, its natural tendency to return to its sealing position illustrated in Figure 1 when the flow of fluid stops, and the ability to be deformed peripherally outwardly upon back pressure being applied thereto. Therefore, in most installations, particularly for low viscosity liquids or for gases, it is preferable to have the cone formed of a resilient material so as to insure a complete peripheral seal notwithstanding any slight irregularities either in the valve itself or in the side walls defining the bore.

Figure 3:
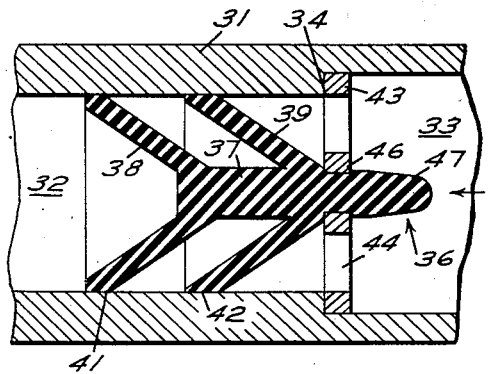
Figure 3 illustrates a portion of a coupling or conduit with a modified form of check valve mounted therein.
Figure 4:
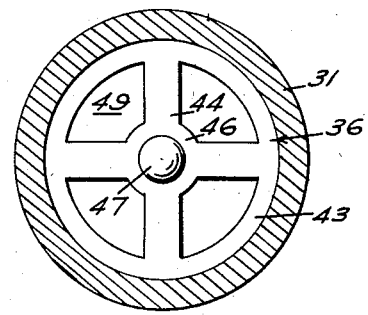
Figure 4 is an end view of the structure shown in Figure 3.

In Figures 3 and 4 of the drawing, a modified form of check valve construction is illustrated wherein a double membrane is utilized for insuring sealing against back flow pressures. Although two membrances are shown, a greater number could be utilized without departing from the scope of the invention.

As shown, the check valve is mounted in a tubular conduit having a cylindrical side wall 31 providing a main bore 32 and an enlarged counterbore 33 with a shoulder 34 provided at the juncture of the bores. The check valve, generally designated by the numeral 36 includes an axially extending stem 37 which is provided with a pair of axially spaced conical portions 38 and 39 respectively. The bases of the cone portions are again flattened as illustrated at 41 and 42 for normal engagement with the side walls defining the conduit bore 32. Stem 37 is maintained in axial position in the bores by means of a retaining ring 43 which is seated against the shoulder 34 and which is provided with a plurality of ribs 44 and a centrally disposed apertured ring 46 at the intersections of the ribs. The distal end 47 of the stem extends through the aperture of the ring 46 and may have a slightly larger diameter than that of the aperture so as to firmly maintain itself in position, such distal end being resilient and thereby deformable to permit the assembly of the stem on the ring. In operation, once again assuming fluid to be normally flowing in the direction of the arrow, such fluid will enter the spaces 49 between the ribs 44 and engage the rearwardly tapering conical portion 39 deflecting the same radially inwardly and then performing the same function on the conical member 38. Once again, there will be provided an annular space between the cone portions 41 and 42 and the side walls of the bore permitting the flow of fluid therebetween. However, in the event of any back flow, the conical members will be forced against the side walls of the bore and effectively provide a seal.

Figure 5:
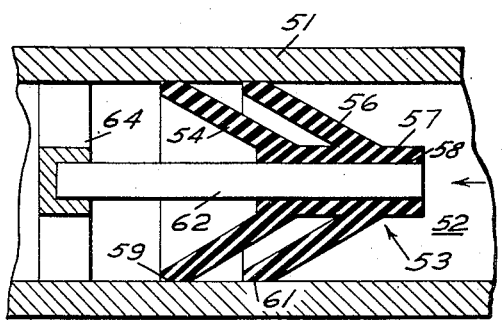
Figure 5 is a cross-sectional view illustrating a further modified form of check valve construction.

In Figure 5, a still further modified form of check valve is shown in operative position in a conduit 51 which defines a bore 52. A check valve 53 is again provided with a double membrane and includes a pair of axially spaced conical members 54 and 56 which are integrally formed on a tubular stem 57 having an axially extending aperture 58 formed therein. The distal end portions or bases of the core portions 54 and 56 are provided with flattened portions 59 and 61 for engagement with the side walls of the bore and the cones are maintained in their axial position within the bore by telescopically mounting the stem 57 on an axially extending rod 62, the latter being held in position by a ring made in the form of a spider 64. In this manner, the liquid, flowing in the direction of the arrow in normal use will first engage the cone member 56, and then the cone member 54, deflecting both of such members radially inwardly so as to provide the annular fluid passageway, and then pass through the openings of the rod supporting spider 64. In preventing back flow, the operation of the cone members is the same as that previously described and without any pressure in the line, the rubber or other resilient form of the check valve will cause it to maintain the position illustrated in the drawing.

Figure 6:
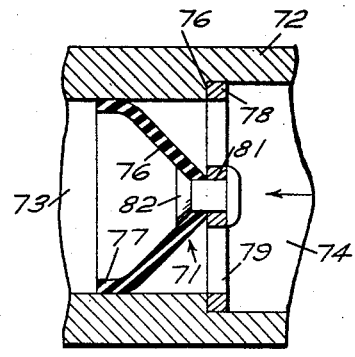
Figure 6 is a cross-sectional view illustrating another type of check valve.

A still further modification is illustrated in Figure 6 of the drawing in which the check valve 71 is mounted in a conduit 72 having a bore 73 and an enlarged counterbore 74 with a shoulder 76 provided at the juncture of the bores. The check valve is constructed slightly differently from the conical configuration of the membrane as described in connection with the other embodiments of the invention and is more in the nature of a hemispherical membrane portion. Actually, the membrane includes a rearwardly and outwardly tapering side walls 76 and a peripherally extending flange 77 which is adapted to seat on and engage the side walls of the bore 73. The portion 76 may be held in axial position in the bore by providing a retaining ring 78, including a spider-like arrangement 79 and a central aperture 81 so as to permit a tapered head rivet 82 to secure the apex of the portion 76 to the center of the spider. In operation, upon normal flow of fluid as illustrated in the drawing, the hemispherical membrane will be deformed radially inwardly from the normal position illustrated and permit the flow of fluid past the valve. Any contra flow will be effectively prevented as the valve will assume its normal position and upon reverse pressure being applied thereto the portion 77 will be forced against the bore walls and effectively prevent flow of fluid past the same.

From the foregoing description it will be appreciated that while the check valve is of simple design and construction, it may be used with either gaseous or liquid fluids and may be made of any convenient size for various types of installations. In view of the fact that there are no moving parts other than deformation of the membrane member itself, there is nothing to become inoperative nor are any maintenance problems involved.

What is claimed is:

1. A check valve for providing unidirectional flow of fluid through a generally cylindrical conduit, comprising a plurality of thin-walled flexible conical members having their outer peripheral edges in contact with the internal wall of said conduit at axially spaced points therealong, a supporting stem secured in said conduit and extending axially thereof and carrying said plurality of conical members by their reduced diameter ends as a unitary structure with the said ends facing upstream of the desired direction of fluid flow, said stem having a cross-sectional area substantially less than the area of said conduit and said thin-walled conical members accordingly having large area flexing portions normally resiliently positioned in engagement with said wall to provide ready flexing away from said wall upon the application of very small fluid pressures in the downstream direction and individually sealing against the wall at said spaced points upon the application of greater fluid pressure in the opposite direction.

2. A check valve in accordance with claim 1 wherein said stem and said conical members are constructed integrally.

References Cited in the file of this patent

UNITED STATES PATENTS

| | | |
|---|---|---|
| 155,668 | Painter | Oct. 6, 1874 |
| 729,835 | Barnes | June 2, 1903 |
| 2,038,055 | Oliver | Apr. 21, 1936 |
| 2,048,657 | Jaeger | July 21, 1936 |
| 2,270,333 | Osborn | Jan. 20, 1942 |
| 2,329,960 | Verheul | Sept. 21, 1943 |
| 2,675,823 | Langdon | Apr. 20, 1954 |
| 2,770,443 | Rand | Nov. 13, 1956 |